US008326669B2

(12) United States Patent
Korupolu et al.

(10) Patent No.: US 8,326,669 B2
(45) Date of Patent: Dec. 4, 2012

(54) SYSTEM AND METHOD FOR SELECTING AND SCHEDULING CORRECTIVE ACTIONS FOR AUTOMATED STORAGE MANAGEMENT

(75) Inventors: Madhukar R. Korupolu, Sunnyvale, CA (US); Sandeep M. Uttamchandani, San Jose, CA (US); Kaladhar Voruganti, San Jose, CA (US); Li Yin, Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 1370 days.

(21) Appl. No.: 11/737,249

(22) Filed: Apr. 19, 2007

(65) Prior Publication Data

US 2008/0262890 A1  Oct. 23, 2008

(51) Int. Cl.
G06F 9/44 (2006.01)
(52) U.S. Cl. ............ 705/7.22; 705/7.11; 705/7.12; 705/7.25
(58) Field of Classification Search ............ 705/7.11, 705/7.12, 7.22, 7.25
See application file for complete search history.

(56) References Cited

U.S. PATENT DOCUMENTS

| | | | |
|---|---|---|---|
| 5,353,422 A | 10/1994 | Kobayashi et al. | |
| 6,473,794 B1 * | 10/2002 | Guheen et al. | 709/223 |
| 6,557,035 B1 * | 4/2003 | McKnight | 709/224 |
| 6,832,205 B1 | 12/2004 | Aragones et al. | |
| 6,862,623 B1 | 3/2005 | Odhner et al. | |
| 6,898,564 B1 | 5/2005 | Odhner et al. | |
| 6,938,240 B2 | 8/2005 | Charisius et al. | |
| 7,243,351 B2 * | 7/2007 | Kundu | 709/223 |
| 7,464,298 B2 * | 12/2008 | Dan et al. | 714/38.14 |
| 7,693,982 B2 * | 4/2010 | Goldszmidt et al. | 709/224 |
| 7,716,077 B1 * | 5/2010 | Mikurak | 705/7.12 |
| 7,720,968 B2 * | 5/2010 | Clarke et al. | 709/226 |
| 7,752,020 B2 * | 7/2010 | Seppanen et al. | 703/6 |
| 7,870,243 B1 * | 1/2011 | Aikens et al. | 709/224 |
| 2002/0152305 A1 * | 10/2002 | Jackson et al. | 709/224 |
| 2002/0194326 A1 | 12/2002 | Gold et al. | |
| 2003/0036886 A1 * | 2/2003 | Stone | 702/188 |
| 2003/0220899 A1 | 11/2003 | Numanoi et al. | |
| 2004/0049297 A1 * | 3/2004 | Card et al. | 700/28 |
| 2005/0188075 A1 * | 8/2005 | Dias et al. | 709/224 |
| 2006/0059253 A1 * | 3/2006 | Goodman et al. | 709/223 |
| 2006/0143024 A1 * | 6/2006 | Salle et al. | 705/1 |
| 2006/0161884 A1 * | 7/2006 | Lubrecht et al. | 717/104 |

OTHER PUBLICATIONS

"A Self Evolving Model Based Approach for Automating the Observe Analyze", by Sandeep Uttamchandani, University of Illionis at Urbana Champaign, 2001.*
"Using Lightweight Checkpoint Recovery to Improve the Availability and Designability of Shared Memory", by Daniel Sorin, University of Wisconsin, Madison, 2002.*
"Ensembles of Models for Automated Diagnosis of System Performance Problems", by Steve Zhang et al., Internet System and Storage Laboratory, HP Laboratories, Palo Alto, Jun. 23, 2005.*

(Continued)

Primary Examiner — Scott L Jarrett
Assistant Examiner — Pan Choy
(74) Attorney, Agent, or Firm — Gibb & Riley, LLC (57) ABSTRACT

Disclosed is a storage management framework that integrates corrective action plans output from multiple different types of planning tools, sorts the different corrective action plans based on utility and risk values and outputs a time-based schedule for implementing one or more of the corrective action plans to resolve identified current and anticipated workload service level objective (SLO) violations.

23 Claims, 4 Drawing Sheets

OTHER PUBLICATIONS

"Performance Evaluation for Self-Healing distributed Services", by E. Grishikashvili et al., Department of Computing and IS, Edge Hill University College, St. Helen's Road, Ormskirk, L39 4QP. Proceedings of the 2005 11th International Conference on Parallel and Distributed System, IEEE, 2005.*

"Self-Adaptive and Self-Healing Message Passing Strategies for Process-Oriented Integration Infrastructures", By Yves Caseau, Proceedings of the 11th IEEE International Conference and Workshop on the Engineering of Computer-Based System, IEEE, 2004.*

"Self-healing System", by Debanjan Ghosh et al., Department of Management Science and Systems, School of Management, SUNY, Buffalo, NY. Jun. 7, 2006.*

"Self-healing for Autonomic Pervasive Computing", by Shameem Ahmed, Department of Mathematics, Statistics and Computer Science, Marquette University Graduate School, Aug. 2006.*

Lin Yin et al., "Chameleon: A Self-evolving, Fully-adaptive Resource Arbitrator for Storage Systems", University of California at Berkeley; Feb. 17, 2005.*

Li Yin, "Automatic Action Advisor for Storage System Performance Management", Electrical Engineering and Computer Sciences, University of California at Berkeley; Nov. 28, 2006.*

Kristal T. Pollack et al., "Genesis: A Scalable Self-Evolving Performance Management Framework for Storage Systems", University of California, Santa Cruz; Proceedings of the 26th IEEE International Conference on Distributed Computing System; 2006.*

Guillermo A. Alvarez, "Minerva: An Automated Resource Provisioning Tool for Large-Scale Storage Systems", Hewlett-Packard Laboratories; ACM Transactions on Computer Systems, vol. 19, No. 4, Nov. 2001, pp. 483-518.*

Li Yin et al., "Smart: An Integrated Multi-Action Advisor for Storage Systems", University of California at Berkeley; 2006 USENIX Annual Technical Conference; 2006.*

Aameek Singh et al., "Zodiac: Efficient Impact Analysis for Storage Area Networks", Georgia Institute of Technology, USENIX FAST '05 Technical Paper; Nov. 16, 2005.*

S. D'Antonio, S. Esposito, M. Gargiulo, M. Romano, S. P. Ventre, "A Component-based Approach to SLA Monitoring in Premium IP Networks", First Intl. Workshop on Inter-Domain Performance and Simulation, Salzburg; 2003.*

Zhikui Wang, XiaoYun Zhu, and Sharad Singhal, "Utilization and SLO-Based Control for Dynamic Sizing of Resource Partitions", Hewlett Packard Laboratories, Palo Alto; IFIP International Federation for Information Processing; 2005; p. 133-144.*

Yin, et al., "SMART: An Integrated Multi-Action Advisory for Storage Systems," 2006 USENIX Annual technical Conference Abstract, May 30-Jun. 3, 2006, pp. 229-242.

Yin, Li, "Automatic Action Advisor for Storage System Performance Management," Technical Report No. UCB/EECS-2006-160, http://www.eecs.berkeley.edu/Pubs/TechRpts/2006/EECS-2006-160.html, Nov. 28, 2006, pp. 1-169.

* cited by examiner

T = Throttling, M = Migration, N = New Hardware

Figure 4b

SYSTEM AND METHOD FOR SELECTING AND SCHEDULING CORRECTIVE ACTIONS FOR AUTOMATED STORAGE MANAGEMENT

BACKGROUND

1. Field of the Invention

The embodiments of the invention generally relate to storage system management, and, more particularly, to a system and a method for selecting and scheduling corrective actions to solve current and anticipated service level objective violations in a data storage system.

2. Description of the Related Art

Currently, there are different types of planning tools that can be used by storage system administrators to develop corrective action plans in response to identified current and anticipated workload service level objective (SLO) violations. These planning tools include, but are not limited to, workload throttling planning tools, buffer size planning tools, data migration planning tools and new hardware planning tools. A major limitation with these planning tools is that the storage system administrator must manually decide which tools to select and when to deploy the corrective action plans developed by those tools in order to solve an identified workload SLO violation. Manual selection of a planning tool and of corrective action plans is increasingly becoming difficult due to an increase in the number of storage resources, applications, and business policies.

SUMMARY

In view of the foregoing, disclosed herein is a storage management framework that integrates corrective action plans output from multiple different types of planning tools, sorts the different corrective action plans based on utility and risk values and provides a time-based schedule for implementing one or more of the corrective action plans.

Embodiments of the management system can comprise a controller, multiple different corrective action planning tools (e.g., a workload throttling planning tool, a buffer size planning tool, a data migration planning tool, a new hardware planning tool, etc.) and a translator for providing communication between the controller and the different planning tools.

The controller can receive input from the storage system administrator as well as directly from the data storage system. This input can include, but is not limited to, administrator-defined business-level constraint information, system state information and triggering event information. The administrator-defined business-level constraints can comprise per-workload utility functions, budget constraints, a desired analysis window and service-level objectives (SLOs) information (e.g., workload SLOs and violation thresholds for those workload SLOs). System attributes can comprise the current system state and the time-series values of workload request-rates (i.e., anticipated states in the future). Specifically, these states can comprise the hardware components (arrays, switches etc.) and their utilization; the current and anticipated workload characteristics (e.g., IOPS, read write ratio, request size, random sequential ratio); and a mapping of workloads to components. Triggering event details can comprise the triggering event type (e.g., proactive in response to an anticipated SLO violation or reactive in response to a current SLO violation) and the possible affected components.

The controller can further evaluate the inputs and, particularly, evaluate the triggering event details in light of the business constraints to determine if corrective action is warranted (e.g., based on actual or anticipated system utility loss as a result of the current or anticipated workload SLO violations, respectively).

The controller can also generate a query and communicate that query to the different planning tools via the translator, if corrective action is deemed warranted. Specifically, the query can comprise a selection of planning tools to which the query is directed, the current and anticipated states of the system and the utility functions of the workloads. Additionally, rather than a single query, the controller can generate a plurality of queries to be directed to each of the planning tools. These queries can each specify a different time period and request a corrective action plan that is optimized for that specified time period.

Each of the planning tools can develop corrective action plans that can be implemented in response to the triggering event and, if applicable, that are optimized for a time period specified in the query.

The translator allows communication between the controller and the various planning tools. That is, both the controller and the planning tools can be in communication with the translator. The controller can forward the query or queries to the translator, where they are translated into the appropriate formats for input into the different planning tools. As the corrective action plans are developed by the planning tools, they can be forwarded to the risk-utility calculator.

Each corrective action plan can comprise a recommendation for a corrective action along with the parameters of the action, approximate times for initiating and completing the action, costs for implementing the corrective action, predicted performance of workloads in response to the action and, if applicable, the specified time period for which the corrective action plan was generated.

The risk-utility calculator calculates risk and utility values for each of the corrective action plans recommended by each of the planning tools, based on the business constraints and on the system attributes. The utility value of a corrective action plan can comprise an expected benefit to the data storage system if the corrective action plan is implemented and the risk value can comprise the probability that the expected benefit will be lost as a result of volatility in workload time-series functions and/or as a result of human error. Once the utility and risk values are determined, the risk-utility calculator can forward a list of the corrective action plans, along with their corresponding utility and risk values, to the controller.

The controller can then create and output a schedule for implementing at least one of the corrective action plans recommended based on the risk and utility values. Specifically, the controller can create and output a time-based schedule specifying one or more corrective action plans, specifying the sequence for the implementing those corrective action plans(s) and specifying the approximate times for initiating and completing performance of those corrective action plan(s). This schedule can also set out checkpoint states (i.e., a set of anticipated states that the data storage system will exhibit as the corrective action plans are implemented according to the schedule).

The management system can also comprise at least one monitor for continuously monitoring the state of the data storage system and forwarding this state information to the controller. Thus, as corrective action plans are implemented according to the schedule, the controller can determine the impact on the data storage system of corrective action implementation and can further alter the schedule, as necessary (e.g., if the actual state of the data storage system at a given time differs significantly from the checkpoint state for that given time).

Embodiments of the method of managing a system as described above can comprise receiving inputs from the storage system administrator as well as directly from the data storage system itself. These inputs can comprise administrator-defined business-level constraints, system attributes and a triggering event, as described above.

The method can further comprise automatically evaluating the inputs and, particularly, evaluating the triggering event details in light of the business constraints to determine whether or not corrective action is warranted (e.g., based on actual or anticipated system utility loss as a result of the current or anticipated workload SLO violations, respectively). If corrective action is warranted, the method can comprise automatically generating a query. This query can comprise a selection of the planning tools to which the query should be directed, the current and anticipated states of the data storage system, and the utility functions of the workloads. Additionally, rather than a single query, a plurality of queries can automatically be generated, each identifying a different time period (e.g., a day, a week, a month, a year and/or any other specified number of days) and requesting a corrective action plan that is optimized for that time period.

Once generated, the query or queries can be automatically translated into the appropriate formats for input into each of the specified planning tools and can be communicated to those different planning tools. Corrective action plans are then developed by and received back from each of the planning tools in response to the query/queries.

Each of the corrective action plans can comprise a recommendation for a corrective action along with the parameters of the action, approximate times for initiating and completing the action, costs, and predicted performance of workloads in response to the action. If applicable, each plan can also indicate the specified time period for which it was optimized.

Upon receipt of the corrective action plans, risk and utility values are automatically calculated for each of the recommended corrective action plans from each of the different planning tools based on the parameters of the actions, the business constraints and the system attributes.

Once the utility and risk values are determined, a schedule for performing at least one of these corrective actions can be created and output based on the risk and utility values. Creating the schedule comprises selecting one or more of the corrective action plans, determining the sequence for implementing those corrective action plans(s), and determining the approximate times for initiating and completing performance of those corrective action plan(s). Checkpoint states (i.e., a set of anticipated states that the data storage system will exhibit as the corrective action plans are implemented according to the schedule) can also be determined.

Implementation of the corrective action plans according to the schedule can be automated and/or manual.

The method can further comprise continuously monitoring the state of the data storage system and determining the impact on the data storage system of implementing the corrective action plans. Thus, the schedule can be automatically altered, as necessary (e.g., if the actual state of the data storage system at a given time differs significantly from the checkpoint state for that given time).

Finally, also disclosed are embodiments of a program storage device readable by computer and tangibly embodying a program of instructions executable by the computer to perform the method described above.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Storage management by storage administrators is limited due to the set of complex storage management tasks that a system administrator must perform (e.g., provisioning, performance bottleneck evaluation, planning for future growth, backup/restore, security violation analysis, interactions with application, network and database system administrators, etc.). Therefore, tools have been developed to try and increase the amount of storage that can be managed by a single system administrator. Exemplary storage management tools include an analyze, design, implement (ADI) loop, an observe, analyze, act (O-A-A) loop, and a monitor, analyze, plan and execute (MAPE) loop.

These acronyms (e.g., MAPE) describe the underlying storage automation paradigm being advocated. For example, MAPE provides monitoring agents to automate the task of monitoring storage systems (M), and work-flow mechanisms to automate storage provisioning and device control tasks. The analysis (A) part includes failure analysis and workload analysis to determine the cause of a problem or a policy violation. The planning part (P) uses a planning tool to determine what corrective actions should be taken and when to take them when problems are detected and the reasons for the problems have been analyzed. The execute (E) part allows for manual or automated execution of the corrective action plan developed by the planning tool. Finally, MAPE has a feedback loop to continuously observe whether the system is satisfying the performance, capacity, security, availability etc. goals, so that additional corrective actions can be taken if necessary.

The present invention relates to the planning aspect of these storage management automation paradigms and particularly with the planning tools that are incorporated into them. As mentioned above, there are different types of planning tools that can be used by storage system administrators to develop corrective action plans in response to identified current and anticipated workload service level objective (SLO) violations in data storage system performance. These planning tools include, but are not limited to, workload throttling planning tools, buffer size planning tools, data migration planning tools and new hardware planning tools.

Figure 4A:
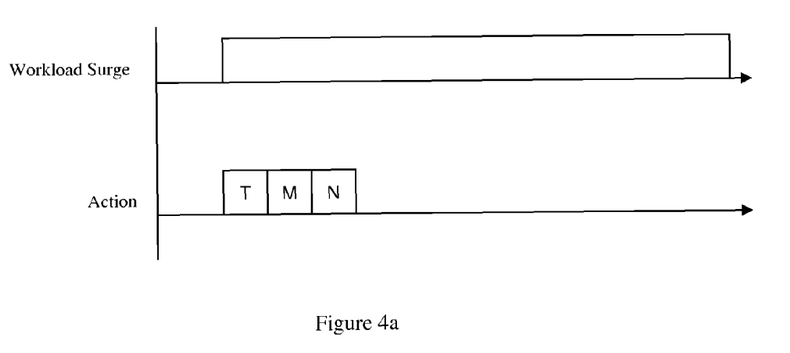
FIGS. 4a and 4b are charts illustrating exemplary planning issues.

A major limitation with current automated storage management systems is a lack of integration of multiple planning tools into a single system. For example, when an SLO for a workload gets violated there will be situations when a combination of actions would provide the most optimum cost savings. That is, as shown in FIG. 4a, in response to a violation of a workload SLO, it might be desirable to throttle (T) the workload until the data associated with the workload can be migrated (M) to a less contended array rank, and if necessary can be eventually migrated to a new rank that is part of a newly provisioned array (N).

Figure 4B:
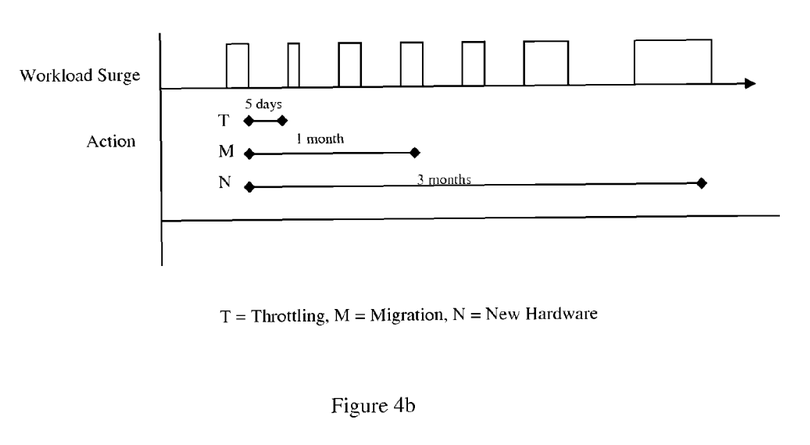

Another limitation of current automated storage management systems is that the prior art planning tools are used without temporal considerations. That is, currently, most storage planning tools do not allow administrators to evaluate plans for different observation time windows. However, cost-wise different solutions could be optimal during different observation windows. For example, as illustrated in FIG. 4b, if the system administrator wants to optimize the planning solution for a time window of three months, addition of new hardware (N) would be the best solution. However, if the time window for optimization is one month, then data migration (M) is the most cost effective solution, and if time window for optimization is five days, then throttling (T) is the most optimal solution.

Because of these limitations, storage system administrator currently must manually decide which tools to select and when to deploy the corrective action plans developed by those tools in order to solve an identified workload SLO violation. Manual selection of a planning tool and of corrective action plans is increasingly becoming difficult due to an increase in the number of storage resources, applications, and business policies.

In view of the foregoing, disclosed herein is a storage management framework that integrates corrective action plans output from multiple different types of planning tools, sorts the different corrective action plans based on utility and risk values and provides a time-based schedule for implementing one or more of these corrective action plans to resolve identified current and anticipated workload service level objective (SLO) violations.

Figure 1:
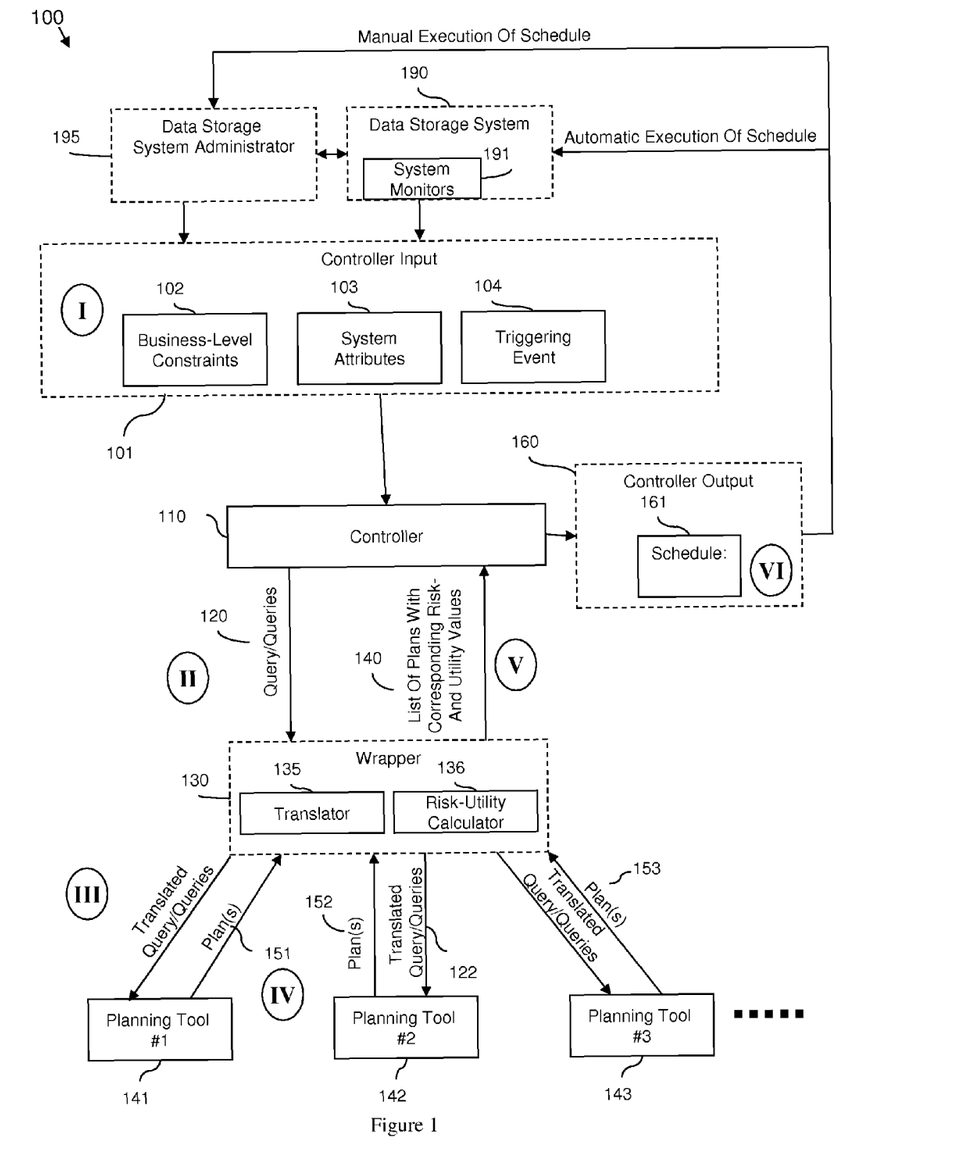
FIG. 1 is a schematic diagram illustrating an embodiment of the system of the invention as well as information flow through that system.

Specifically, referring to FIG. 1 disclosed herein are embodiments of a management system 100 to assist a data storage administrator 195 with managing a data storage system 190. The management system 100 can comprise a controller 110, multiple different corrective action planning tools 141-143 (i.e., at least two different planning tools), a translator 135 for providing communication between the controller 110 and the different planning tools 141-143 and a risk-utility calculator 136 for determining risk and utility values action plans 151-153 recommended by the different planning tools 141-143. The translator 135 and risk-utility calculator 136 can, for example, be integrated into a wrapper 130 that comprises programming code allowing communication between the controller 110 and the different planning tools 141-143 as well as programming code to perform risk-utility calculations.

The controller 110 (i.e., a control engine, a computer processor) can be adapted to receive inputs 101 directly from the data storage system 190 (e.g., directly from data storage system monitors 191 via a communications link) and/or from a system administrator 195 via a user interface. These inputs 101 can include, but are not limited to, administrator-defined business-level constraints 102, system attributes 103 and a triggering event (i.e., details of a triggering event) 104. Business constraints 102 can comprise per-workload utility functions (i.e., reward functions), budget constraints, a desired analysis window and service-level objective (SLO) information (e.g., workload SLOs and violation thresholds for those workload SLOs). System attributes information 103 can comprise the current system state as well as time-series forecasting of workload request-rates (i.e., anticipated/predicted future system states). Specifically, the system attributes can comprise the hardware components (arrays, switches etc.) and their utilization; the current and anticipated workload characteristics (e.g., IOPS, read write ratio, request size, random sequential ratio); and a mapping of workloads to components. Triggering events 104 can comprise current SLO violations and/or anticipated SLO violations in light of current and anticipated workload demands, respectively. The triggering event information can specifically comprise the triggering event type (i.e., a proactive in response to an anticipated SLO violation placing the system in normal mode or reactive in response to a current SLO violation placing the system in unexpected mode) and the possible affected storage system components.

The controller 110 can further be adapted to (e.g., programmed to) evaluate this input 101 and, particularly, to evaluate the triggering event details 104 in light of the business constraints 102 to determine if corrective action is warranted (e.g., based on actual or anticipated system utility loss as a result of the current or anticipated workload SLO violations, respectively). The controller 110 can also be adapted to automatically generate a query to be communicated to the planning tools 141-143 requesting recommendations for corrective actions that can be implemented in response to the triggering event (if such corrective actions are deemed to be warranted).

More specifically, upon a determination that corrective action is warranted, a query 120 is generated by the controller 110 and communicated to the different planning tools 141-143 via the translator 135 (e.g., integrated into a wrapper 130). This query 120 can comprise a selection of planning tools to which the query is directed (e.g., all tools, only tools 141 and 142, etc.), the utility functions of the workloads (from business-level constraints information 102), and the current and anticipated states of the system (from system attributes information 103). Additionally, rather than a single query, the controller 110 can generate a plurality of queries 120 each of which specifies a different time period (e.g., a day, a week, a month, a year and/or any other specified number of days) and each of these queries can request from each of the planning tools 141-143 a corrective action plan that is optimized for that specified time period.

The corrective action planning tools 141-143 can, for example, comprise planning tools (e.g., a workload throttling planning tool, a buffer size planning tool, a data migration planning tool, a new hardware planning tool, etc.) that are newly developed or off-the-shelf planning tools. Each of these tools can be designed to automate invocation of a single type of corrective action (e.g., workload throttling, buffer size adjusting, data migration, hardware additions, etc.). Each of these tools typically includes the logic for deciding the action invocation parameter values and an executor to enforce these parameters. That is, the single action tools 141-143 take the query 120 inputs and output the invocation parameters for corrective action plans 151-153 that can be implemented in response to the triggering event 104. For example, in the case of migration, a data migration planning tool decides the data to be migrated, the target location, and the migration speed. These planning tools 141-143 can also be adapted to optimize corrective action plans for time periods specified in the queries 120 (e.g., a day, a week, a month, a year and/or any other specified number of days).

The translator 135 (e.g., that is integrated into a wrapper 130) can be used to promote communication between the controller 110 and the various planning tools 141-143. That is, both the controller 110 and the planning tools 141-143 can be in communication with the translator 135. The controller 110 can forward the query/queries 120 to the translator 135, where they are automatically translated (i.e., converted) into the appropriate formats for input into the different planning tools 141-143 (e.g., into the appropriate formats for input into two or more different planning tools as specified in the query/queries 120).

As the corrective action plans 151-153 are developed by the planning tools 141-143, they can be forwarded to risk-utility calculator 136 (e.g., that is also integrated into the wrapper 130).

Each of the corrective action plans 151-153 that are forwarded to the risk-utility calculator 136 can comprise a recommendation for a corrective action along with the parameters of the action, approximate times for initiating and completing the action, costs for implementing the corrective action, predicted performance of workloads in response to the action and, if applicable, the specified time period for which the corrective action plan was generated. Every corrective action recommended has a cost in terms of the resource or budget overhead and a benefit in terms of the improvement in the performance of the workloads. Thus, the action invocation parameters are used by the risk-utility calculator 136 to determine the resulting performance of each workload and the corresponding utility value.

More specifically, the risk-utility calculator 136 is adapted to calculate risk and utility values for each of the corrective action plans recommended by each of the planning tools based on the action invocation parameters, the business constraints 102 and on the system attributes 103. The utility value of a corrective action plan can comprise an expected benefit to the data storage system if the corrective action plan is implemented and the risk value can comprise the probability that the expected benefit will be lost as a result of volatility in workload time-series functions and/or as a result of human error.

If each of the planning tools 141-143 outputs multiple corrective action plans, each of which corresponds to a different specified time period, then the calculator 136 will calculate utility and risk values for each of those multiple corrective action plans. Once the utility and risk values are determined, the risk-utility calculator 136 can forward a list 140 of the corrective action plans 151-153, along with their corresponding utility and risk values, to the controller 110.

The controller 110 can further be adapted to receive the list 140 and to create and output 160 a schedule 161 for implementing at least one of the corrective action plans recommended based on the risk and utility values. Specifically, the controller 110 can be adapted to evaluate each recommended corrective action plan 151-153 from each of the planning tools 141-143 in light of their corresponding risk and utility values in order to create the corrective action schedule 161. The goal of the controller 110 is to select a combination of corrective action plans that will improve the overall system utility or, equivalently, reduce the system utility loss. Thus, for each time period specified, the controller 110 can compare the utility and risk values for each of the corrective action plans recommended by the different planning tools and can determine for that time period which action plan or plans would be most beneficial to implement in light of the corrective actions being implemented during the same or different time periods.

Additionally, given the type of triggering event 104 (i.e., proactive or reactive), the controller 110 can operate in different modes: a normal mode, in which the corrective actions schedule that is created is a proactive response to an anticipated workload SLO violation, and an unexpected mode, in which the corrective actions schedule is a reactive response to current workload SLO violation (see detailed discussion below regarding system operation in the normal vice unexpected modes).

The output 160 of the controller 110 is a time-based schedule specifying one or more corrective action plans, including their action invocation parameters, specifying the sequence for the implementing those corrective action plans(s) and specifying the approximate times for initiating and completing performance of those corrective action plan(s). This schedule 161 can also comprise checkpoint states (i.e., a set of anticipated states that the data storage system will exhibit as the corrective action plans are implemented according to the schedule). This schedule 161 can be output to the storage administrator for manual execution or directly to the data storage system 190 for automated execution.

The management system 100 can also comprise at least one sensor or monitor 191 adapted to continuously monitor the state of the data storage system 190. As mentioned above, the state of the storage system 190 includes the hardware components present in the system and their utilization, the workload characteristics (e.g., input-output/second (IOPs), read-write ratio, request size, random sequential ratio, etc.), and a mapping of workloads to components as well as information regarding the interconnection between components.

The monitors 191 can be in communication with the controller 110 such that this state information is continuously forwarded (as workload and component information 104-105) to the controller 110 for monitoring. Thus, as corrective action plans are implemented according to the schedule 161, the controller 110 can determine the impact on the data storage system 190 of implementing the corrective action plans and can further alter the schedule 151, as necessary, based on differences between the actual state of the data storage system 190 at a given time and the checkpoint state set out in the schedule 161 for that given time.

Figure 2:
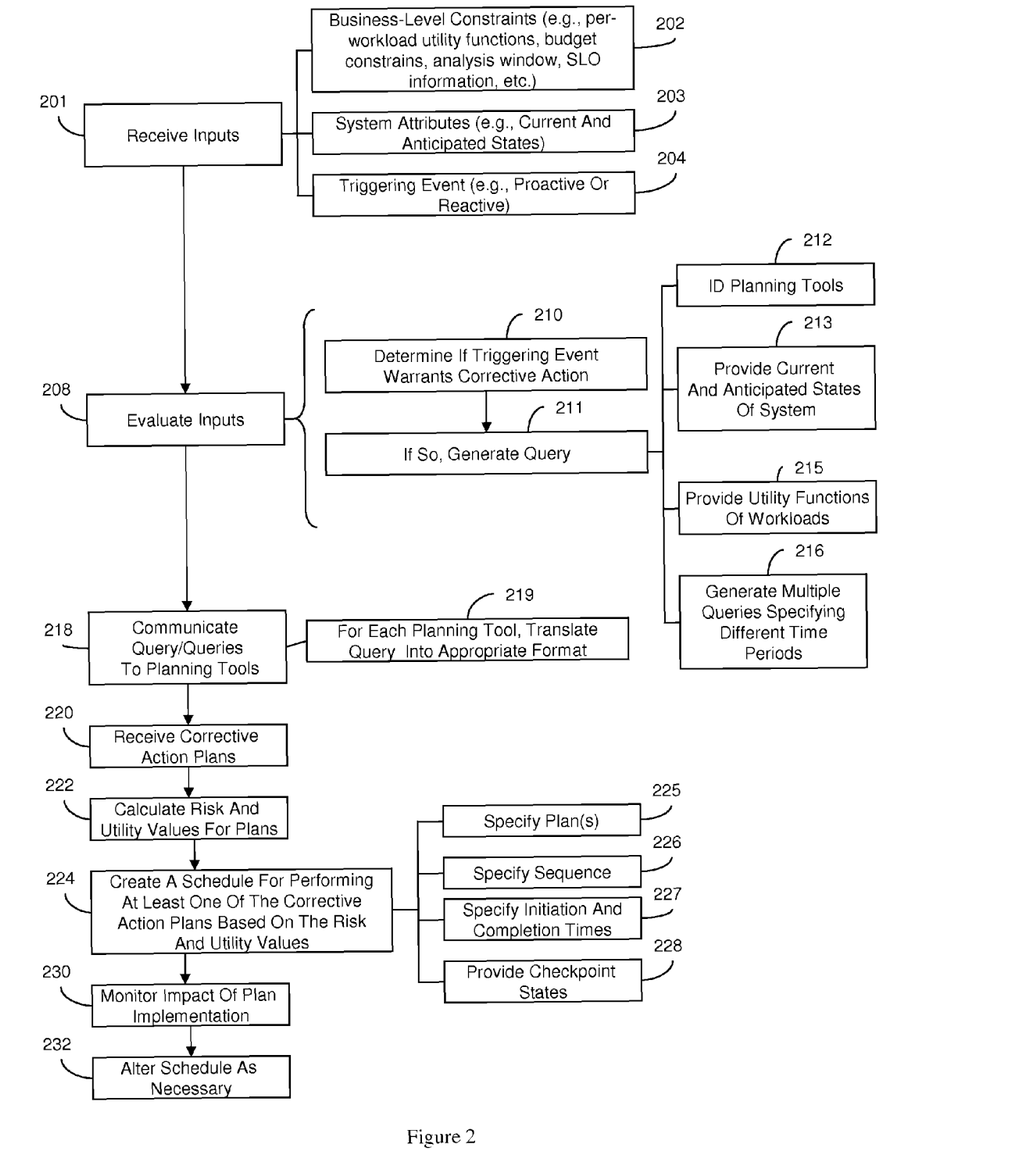
FIG. 2 is a flow diagram illustrating an embodiment of the method the invention.

Referring to FIG. 2 in combination with FIG. 1, also disclosed herein are embodiments of a method of managing a data storage system 190 and, more particularly, embodiments of a method of automatically developing a time-based corrective actions schedule 161 for resolving identified current and anticipated workload service level objective (SLO) violations within a data storage system 190.

The method embodiments can comprise receiving, as input to controller 110, data storage system information (201) and, specifically, receiving administrator-defined business-level constraint information 102, system state information 103 and triggering event information 104 (202-204). Receiving administrator-defined business-level constraint information 102 can comprise receiving per-workload utility (i.e., reward) functions, budget constraints, a desired analysis window and service-level objectives (SLOs) information (e.g., workload SLOs and violation thresholds for those workload SLOs). Receiving system attributes information can comprise receiving the current system state and the time-series values of workload request-rates (i.e., anticipated further states). Specifically, the system attributes information can comprise the hardware components (arrays, switches etc.) and their utilization; the current and anticipated workload characteristics (e.g., IOPS, read write ratio, request size, random sequential ratio); and a mapping of workloads to components. Receiving triggering event information can comprise receiving information regarding current SLO violations and/or anticipated SLO violations identified in light of current and anticipated workload demands, respectively, such that the corrective actions scheduling system can be triggered reactively or proactively. The triggering event information specifically can include the triggering event type (proactive or reactive) and the possible affected components.

The method can further comprise automatically evaluating the data storage system information 101 (208) and, particularly, evaluating the triggering event information 104 in light of the business constraints information 102 to determine whether or not corrective action is warranted (210) (e.g., based on actual or anticipated system utility loss as a result of the current or anticipated workload SLO violations, respectively). If corrective action is warranted, planning tools 141-143 can be automatically queried by the controller 110 for corrective action plans for implementing in response to the identified workload SLO violations (211).

More specifically, a query 120 can be automatically generated requesting corrective action plans (211). This query 120 can comprise a selection of the planning tools 141-143 to which the query should be directed (e.g., a list of two or more of the following planning tools: a workload throttling planning tool, a buffer size planning tool, a data migration planning tool or a new hardware planning tool) (212), the current and anticipated states of the data storage system (see system attributes information 103) (213), and the utility functions of the workloads (see business constraints information 102) (215). As mentioned above, the state of the data storage system (213) can comprise the hardware components present in the system and their utilization, the workload characteristics (e.g., input-output/second (IOPs), read-write ratio, request size, random sequential ratio, etc.), and a mapping of workloads to components. The state information can also include information regarding the interconnection between components. Additionally, rather than a single query, a plurality of queries 120 can be generated each of which specifies a time period (e.g., a day, a week, a month, a year and/or any other specified number of days) and requests a corrective action plan that is optimized for that specified time period (216).

This query/queries 120 can be communicated to different single action planning tools 141-143 (e.g., to the workload throttling planner, the buffer size adjustment planner, the data migration planner, the additional hardware planner, etc.) via a translator 135 (e.g., that is integrated into a wrapper 130). The translator 135 automatically translates the query/queries 120 into the appropriate formats for input into each of the specified planning tools 141-143 and then communicates them to those different planning tools (218-219). Corrective action plans 151-153 (e.g., workload throttling plans, buffer size adjustment plans, data migration plans, and additional hardware plans, respectively) are then developed by the planning tools 141-143 in response to the query/queries 120 and forwarded to a risk-utility calculator 136 (220).

Each of the corrective action plans 151-153 can comprise a recommendation for a corrective action along with the parameters of the action, approximate times for initiating and completing the action, costs, and predicted performance of workloads in response to the action. If applicable, each plan can also indicate the specified time period for which it was optimized.

Upon receipt of the corrective action plans, risk and utility values are automatically calculated by the risk-utility calculator 136 for each of the recommended corrective action plans 151-153 from each of the different planning tools 141-143 based on the, action parameters, the business constraints 102 and system attributes information 103 (222). The utility value of a plan is calculated as the expected benefit (i.e., utility) to the data storage system if the corrective action plan is implemented and the risk value is calculated as the probability that the expected benefit (i.e., the expected utility) will be lost as a result of volatility in workload time-series functions and/or as a result of human error. If each planning tool outputs multiple corrective actions, each of which corresponds to a different specified time period, then utility and risk values are calculated by for each of the multiple corrective actions recommended.

Once the utility and risk values are calculated, the corrective plans 151-153 and their associated risk and utility values can be forwarded to the controller 110 and a schedule 161 for performing at least one of these corrective actions can be created and output 160 by the controller 110 based on the risk and utility values (224). Specifically, the process of creating the schedule 161 comprises automatically evaluating each recommended corrective action plan from each of the planning tools in light of their corresponding risk and utility values. More specifically, for each time period specified, the utility and risk values for each of the corrective action plans 151-153 from each of the different planning tools 141-143 are compared to determine for that time period which action plan or plans would be most beneficial to implement in light of other plans being implemented during the same or different time periods.

However, depending upon the type of triggering event, the process steps used to create the schedule may vary between a normal mode, in which the corrective actions schedule that is created is a proactive response to an anticipated workload SLO violation, and an unexpected mode, in which the corrective actions schedule is a reactive response to current workload SLO violation (see detailed discussion below).

Then, in order to form the schedule, one or more of the corrective action plans are selected (225), the sequence for implementing those corrective action plans(s) is determined by sorting according to risk-utility factors (226) and the approximate times for initiating and completing performance of those corrective action plan(s) are also determined (227). Checkpoint states (i.e., a set of anticipated states that the data storage system will exhibit as the corrective action plans are implemented according to the schedule) can also be specified (228).

Output of the schedule 161 can be to the storage system administrator 195 for manual execution or directly to the data storage system 190 for automatic execution.

The method can further comprise continuously monitoring the state of the data storage system 190, using monitors or sensors 191, and determining the impact on the data storage system 190 of implementing the corrective action plans according to the schedule 161 (230). Thus, the schedule 161 can be automatically altered, as necessary, based on differences between the actual state of the data storage system at a given time and the checkpoint state set out in the schedule 161 for that given time (232).

More particularly, in order to address the limitations discussed above with regard to current automated storage management systems and, particularly, to address the lack of planning tool integration and temporal considerations in such systems, disclosed herein is a federated architecture for planning.

Referring again to FIG. 1, in summary, the system 100 is a federated action scheduler for storage systems implemented as a multi-level framework. The lowest level can comprise multiple single action planning tools (i.e., black-boxes) 141-143 for throttling, migration, provisioning hardware, etc. The middle-level can comprise a wrapper 130 (including a translator 135 and a risk-utility calculator 136) for interacting with each individual black-box 141-143. The top level comprise the controller 110 (i.e., a control engine) that queries the black-boxes 141-143 for invocation options (i.e., corrective action plans 151-153) for the current as well as lookahead system states (i.e., anticipated or future system states), that compares the risk-benefit values of these plans 151-153, and decides the time-based invocation schedule 161. In contrast to a monolithic scheduler framework, the approach used in the system 100 is loosely coupled with the details of the actual action implementation, treating them as vendor independent, off-the-shelf black-boxes.

Operation of the automated data storage management system 100 can be a proactive or reactive response to a triggering event (i.e., to an anticipated violation of a workload service level objective (SLO) or a current violation of a workload SLO, e.g., a surge). The control engine 110 calculates the rate of utility loss due to the trigger event; it then analyzes the workload time-series to extrapolate workload demands for several lookahead periods $t_0=2$ days, $t_1=1$ week, ..., $t_n=6$ months, with the upper-bound of the administrator-defined analysis window. Each lookahead state (i.e., anticipated state) is treated as a separate query for the wrapper 130.

The wrapper 130 and, specifically, a translator 135 incorporated into the wrapper 130, translates workload demands and utility. This translation is required only for action black-boxes (i.e., planning tools 141-143) that cannot directly take utility into account. The action black-boxes 141-143 return one or more invocation choices (i.e., corrective action plans 151-153). Each plan includes a recommended action as well as the expected system state (as a result of action invocation), the predicted performance of the individual workloads, the hardware cost (if any), and the approximate lead-time for implementing the action.

The wrapper 130 and, specifically, a risk-utility calculator 136 incorporated into the wrapper 130 calculates the risk value of selecting a recommended action plan based on the accuracy of the time-series predictions, size of the data moved (in the case of migration) or the dollar amount for additional hardware (in the case of provisioning), and the current system utilization (selecting conservative low-benefit action choices versus speculative high-benefit at 11 am of a weekday, and the inverse at 8 pm of a weekend). Finally, the control engine 110 short-lists the corrective action plans 151-153 with utility benefits proportional to their risk, selects one or more of the action plans 151-153 for each lookahead window, and creates an invocation schedule 161 of the selected action plans based on an estimate of the activation time for the action.

In production systems, there are inaccuracies in workload time-series predictions, performance impact of action invocation, and changes to the state of the system after the invocation schedule is selected. Therefore, in addition to the risk formalism of the automated data storage management system 100, the system 100 handles these realities using a feedback mechanism-check-pointing the current system state before a scheduled action is implemented and adjusting the predicted benefit of the corrective action plans from the different planning tools based on past invocations.

A high-level description of the information flow and processing in system 100 is described below. The following terms used in this disclosure are defined as follows:

System state: The system state is defined as a triplet <C,W, M> where:

C represents the hardware components (arrays, switches etc.) present in the system and their current utilization W represents the workload characteristics namely IOPS, read write ratio, request size, random sequential ratio M represents the mapping of workloads to components; it additionally includes information about the interconnection between the components represented as a resource graph.

Bleed-rate: The bleed-rate is the rate of overall system utility lost as a result of SLO violation.

Proactive trigger: A proactive trigger occurs before the actual SLO violation—it is based on a growth trend, a repeating pattern of workload surges, or a seasonal variation in workload characteristics.

Reactive trigger: A reactive trigger is based on an unexpected violation of the workload SLOs—the possible reasons are a surge in the workload request-rate, failure of a fibre channel switch, disk drive failures.

Activation-time for an action: This activation-time represents the time when the action is scheduled to be implemented.

Lead-time for an action: This lead time represents the transient time that is required for the action to come into effect and it is especially applicable to certain actions, such as migration and add hardware.

Referring again to FIG. 1, the information flow across the system 100 is denoted by levels I, II, III ... and the internal processing of each level is represented as I→II, II→III, etc., where the→represents the processing needed for information conversion.

At level I, the input 101 to control engine 110 comprises business constraints BInput 102, system details SInput 103, and details of the triggering event TInput 104 (see also items 201-204 of FIG. 2).

Business constraints (BInput) 102 can comprise a per-workload utility function or reward function $R_W$ (along with SLO violation threshold), a budget B for adding new hardware, and the desired analysis window T. The reward function $R_W$: Supply→Dollars, also referred to as utility functions, associates a dollar amount for each workload based on the amount of service provided for that workload, measured in terms of throughput, bandwidth, latency or a combination of one or more. The budget for buying new hardware (B) is specified as either a single value or as a discrete function of time e.g., dollars available per financial quarter or once every six months. The analysis window T defines the number of months, weeks or days in the future for which the system wants to optimize. The analysis window for the storage systems for large businesses is generally of the order of months and years, while the analysis window for the storage systems of smaller businesses is generally of the order of days and weeks.

Business constraints 102 can also comprise service level objectives (SLO) information 104 such as, workload SLOs and thresholds for violation the SLOs.

System attributes (SInput) 103 can comprise the current system state $S_{current}$=<C,W,M>, and the time-series values of workload request-rates (i.e., anticipated/predicted further workloads). Specifically, the system attributes can comprise information regarding the hardware components (arrays, switches etc.) in the system and their current utilization (C); information regarding the current and anticipated workload characteristics (e.g., IOPS, read write ratio, request size, random sequential ratio) (W); and a mapping of workloads to components (M). System attribute inputs 103 can also comprise information about the interconnection between the components represented as a resource graph.

When advance knowledge of the future workloads is not available, the control engine 110 can be adapted to use well-known time-series analysis techniques to analyze and forecast the workload behavior based on past historical values. The general form of time-series functions is as follows:

$$y_{t+h} = g(X_t, \theta) + \epsilon_{t+h}$$

where:
$y_t$ denotes the variable(s) to be forecast.
t denotes the time when the forecast is made.
$X_t$ are predictor variables, which usually include the observed and lagged values of $y_t$ until time t.
θ is the vector of parameters of the function a.
$\epsilon_{t+h}$ is the prediction error.

Time series analysis can detect linear and non-linear trends, as well as cyclic and seasonal patterns in the historical data. The predictions are based exclusively on the historical data, and are efficient in forecasting short term workload demands.

Triggering event (TInput) 104 can comprise information regarding current SLO violations and anticipated SLO violations in light of current and anticipated workload demands, respectively. That is, operation of the system 100 can be triggered proactively based on known or predicted future workloads which will likely result in an SLO violation or reactively in response to an unexpected surge in workload demands that are currently causing an SLO violation. The TInput 104 includes the triggering type and the possible affected components.

During level I→II, the control engine 110 evaluates the trigger event (see also items 208-210 of FIG. 2). Specifically, the control engine 110 examines the triggering event TInput 104 and evaluates the Bleed-rate of the system (i.e., the amount of utility being lost in the system based on the reward functions of the various workloads, based on business constraints information 102). If this quantity is zero or below a certain threshold (e.g., the SLO violation may only be happening for a low priority/low reward workload) then it may choose not to take any action. If the Bleed-rate is non-trivial, then it proceeds to select the combination of actions by querying the black-boxes (i.e., the planning tools 141-143) (see also item 211 of FIG. 2).

Based on known future workload demands (see state attributes 104), the control engine 110 evaluates several lookahead states, for example, next day, next 1 week, next 1 month, etc., with the analysis window T being the upper bound. Each of these is fed as a separate query 120 to the wrapper 130.

During level II, the output query 120 of the control engine 110 is the input of the wrapper 130. The query 120 comprises one or more black-boxes (i.e., planning tools 141-143) whose invocation choices will be analyzed, the current state of the system $S_{current}$, the utility/reward functions $R_W$ of the workloads, and the series of zero or more lookahead workload demands [W_Demand(1 day), W_Demand(1 week), W_Demand(1 month)].

From level II→III, the wrapper 130 and, specifically, a translator 135 incorporated into the wrapper 130 is defined for each black-box (i.e., for each planning tool 141-143) such that it can translate the control engine's query/queries 120 to the input format of the different black boxes (see also item 218-219 of FIG. 2). Specifically, the wrapper 130 takes as input the utility functions (i.e., the $R_W$s) and projected workload demands $Wi_{demand}$ (information II), and generates as output the per-workload performance target $Wi_{target}$ and states information (information III) such that the overall system utility is maximized (as shown in the equation below).

$$\text{Max} \sum_{i=1}^{num\_wld} R_w(Wi_{target})$$

$$s.t. \ Wi_{target} < Wi_{demand}$$

The performance targets are generally derived as incremental local optima based on greedy algorithms (i.e., demand from workloads leading to higher reward is satisfied first).

During level III, the output of the wrapper 130/translator 135 is tailored to the input of the specific black-box. Using throttling, migration and adding hardware, as our example actions, for existing planning tools, the input format for each of them is as follows: (1) for throttling, the planning tool input can comprise workload priorities, per workload throughput and latency goals; (2) for data migration, the planning tool input can comprise current system state, per workload throughput goal, the time window for action completion, and weights; and (3) for new hardware additions, the planning tool input can comprise current system state, per workload bandwidth and/or capacity goals, number of hosts, upper bound on the hardware cost, number of desired plans, device type preferences, device interoperability constraints.

From level III→IV, new or existing single action planning tools 141-143 (e.g., a workload throttling planner, data migration planner, a new hardware planner, etc.) can be used to process the input from the wrapper 130 and to output corrective action plans 151-153. The system 100 architecture can be such that newly implemented as well as existing planning tools can be readily incorporated into (e.g., plugged into) the system 100.

For example, existing model-based constrained optimizers can incorporated into the system 100 to make per-workload throttling decisions in order to maximize the system utility. The input of the optimizer can comprise the workload SLOs, utility functions, and the current state and the output can comprise the per-workload token issue rate and the predicted throughput and latency. Generally, such an optimizer will internally create and maintain models of components, workloads, and the relationship between token issue-rate and workload throughput.

Existing data migration tools can also be incorporated into the system 100 to make data migration decisions in order to maximize system utility. In frameworks that optimize the mapping of workloads to storage components, the input can comprise workload characteristics, workload performance targets, configuration of the components, and the current workload to component mapping and the output can comprise the new placement decisions for the component to workload mapping, and the expected workload performance as a result of migration.

Similarly, existing new hardware addition frameworks can also be incorporated into the system 100. For example, in such new hardware addition frameworks, the user workloads are represented as logical flows with a bandwidth and latency requirements. Each of the logical flows is mapped into physical flows that are between a host port and a storage controller port. The physical flows are, in turn, routed through the switching fabric. The planner determines the number of HBAs per host, the number of storage controllers, the number of switches, the number of levels in the switching fabric, the fabric interconnectivity, the number of arrays in the storage controller and the RAID level of the arrays.

During level IV, each black-box (i.e., each planning tool 141-143) returns one or more invocation choices (i.e., corrective action plans 151-153) (see also item 220 of FIG. 2). Each of these plans 151-153 has the following attributes: (1) action $A_i$ along with the action invocation parameters (e.g., for migration, the data-set to be migrated, the new location, and an approximate migration speed); (2) approximate action activation-time $t_{ai}$ (e.g., for migration, the time when migration should begin); (3) approximate action lead-time $t_{ei}$ (e.g., for migration, the time when migration will be done; for additional hardware, the time when hardware will be deployed, configured and ready to use, etc.); (4) the Hardware cost (if any); (5) predicted performance of the individual workloads; and (6) if applicable, the specific time window for which this choice has been generated.

From level IV→V, for each of the corrective action plans 151-153 by each of the black-box 141-143, a risk-utility calculator 136 (e.g., incorporated into the wrapper 130) calculates the overall system utility values which will result from implementing the corrective action plans (e.g., using the utility functions of individual workloads) and the risk values of implementing the action (i.e., the probability that the utility improvement will be lost) (see also item 222 of FIG. 2).

More specifically, risk values capture the probability that the utility improvement of action invocation will be lost (in the future system-states) as a result of volatility in the workload time-series functions e.g., the demand for $W_1$ was expected to be 10 K IOPS after 1 month, but it turns out to be 5 K (as a side-point, the inverse of this problem is handle reactively). Additionally, the formulation of risk values should take into account the loss in utility as a result of making the wrong decision. For example, moving data at 11 am in a weekday morning (during high system utilization) has a higher risk compared to moving it at 9 pm on a weekend (during low system utilization)). The utility lost due to a wrong decision is higher in the former case than the later. Similarly, the impact of the wrong decision is dependent on the amount of data moved (in the case of migration), or the cost of new hardware (in the case of hardware planning).

There are several known techniques that can be programmed into the risk-utility calculator 136 for measuring (i.e., calculating) the risk values for corrective action plans 151-153. An exemplary technique is a value-at-risk (VaR) technique, wherein VaR represents the probability with a 95% confidence that the workload system will not grow in the future, making the action invocation unnecessary.

$$VaR(95\% \text{ confidence}) = 1.65\sigma\sqrt{T}$$

where: σ=Standard deviation of the time-series request-rate predictions and T=the number of days in the future for which the risk estimate holds.

The risk value $RF(A_i)$ of action t is calculated as follows:

$$RF(A_i) = (1+a)*VaR$$

where a reflects the risk factors of an individual action (based on its operational semantics) defined as follows:

$$a_{thr} = 0$$

$$a_{mig} = \frac{\text{bytes\_moved}}{\text{total\_bytes\_on\_source}} * Uti_{sys}$$

$$a_{hw} = \frac{\text{hardware\_cost}}{\text{total\_budget}} * (1 - Uti_{sys})$$

where $Uti_{sys}$ is the system utilization when the action is implemented.

During level V, a list 140 of corrective action plans 151-153 from black-boxes 141-143 for different lookahead states, appended with the corresponding system utility values and risk values, are output from the wrapper 130 and input to the control engine 110.

During level VI, the control engine 110 selects one or more of the corrective action plans and generates a time-based invocation schedule 161 as output 160 (see also item 224 of FIG. 2). Specifically, the control engine 110 receives the list 140 of action choices 151-153 from the wrapper 130, including the risk and utility values. The control engine 110 evaluates that list 140 and the output 160 of the control engine 110 is a time-based action schedule 161 comprising a list of action(s), including the invocation parameter values, the sequence in which they are to be implemented, their approximate activation time and checkpoint system states (see also items 225-228 of FIG. 2).

The accuracy of the time-based schedule 161 depends on the time-series predictions and the performance estimates of the black-boxes (i.e., of the planning tools 141-143). Most of the black-box implementations (i.e., most existing planning tools) use explicit models of components and workloads for making their estimates. However, in production systems, these models will never be perfectly accurate. Further, systems are constantly changing, such that the action invocation schedule 161 may not be applicable in the future system state.

Therefore, system 100 continuously monitors (e.g., with sensors 191) the system-state and the impact of actions being implemented according to the schedule 161 (see also item 230 of FIG. 2). Additionally, before implementing a pre-scheduled action, the controller 110 of the system 100 compares the current system state with that of the checkpoint state. This comparison ensures that the state information used for scheduling corrective actions is still valid and, thus, that implementing the corrective actions will still have the predicted improvement on the system utility. If not, the corrective actions set out in the schedule 161 will not be implemented and the schedule 161 can be automatically altered (see also item 232 of FIG. 2).

The system 100 also maintains the approximation error in the predicted and observed utility impact of individual planning tools. This error is used to adjust the predicted performance returned by each planning tool.

As mentioned above, during level VI, the control engine 110 selects corrective action plans and generates a time-based invocation schedule 161 as output 160 (see item 224 of FIG. 2). However, action plan selection has several interesting challenges: First, workloads and business utilities change over time (e.g., in terms of short term surges and long term trends). Second, actions are not always independent of each other. For example, the migration planning tool may predict a certain amount of time for completing the migration task. However, if during that time the throttling tool throttles or unthrottles another workload, this action will affect the results of data migration in the data storage system. Third, the results of one corrective action will affect the results of a subsequent corrective action. For example, a migration action could change the location of workloads, and therefore, a throttling decision following it should consider the new state. Fourth, some actions such as migration, replication, addition of hardware, etc., involve a non-zero lead-time and effective-time. In evaluating the benefit of such actions, the utility at a single snapshot of time will not reflect the whole picture. Thus, any solution should take into account the set of actions and all possible combinations of them along the time line, and pick the best possible schedule.

System administrators are faced with the task of making these choices on a regular basis. Towards this end, the embodiments of the system and method of the present invention incorporate an algorithm that (a) solves the data storage system's short term and long term needs, and (b) results in as low a cumulative utility loss as possible. One concept is, rather than considering all actions and combinations along the whole time line, the complexity is reduced by breaking the problem into different phases along the time line in order to find local-optimal solutions for each phase and then to connect them together as the final multiple action scheduling solution 161 for the whole time line.

That is, the controller 110 can respond to a triggering event by generating not one, but multiple queries, each of which specifies a different time period (e.g., one day, one week, one month, etc.). Specifically, the control engine 110 gets the following inputs 101: (a) system state inputs 103 (e.g., current system state $S_0 = <C_0, W_0, M_0>$ and workload time-series); (b) business constraints input 102 (e.g., reward function $R_W$: Supply→Dollars for each workload $W \in W$, budget B for new hardware, and lookahead time T) and (c) triggering event input 104 (e.g., proactive lookahead planning or reactive SLO violation handling). Given these inputs 101, the control engine's goal is to produce a schedule 161 of actions to be performed to solve the system's problems while keeping the utility loss over the lookahead time T as low as possible.

The control engine 110 in the normal mode assumes that the future workload demands are known, or that the observed workload demands are close to the predicted ones. This is the natural mode for most known planning kind of tools. However, in practice the workload demands may deviate from the predicted values (e.g., an unexpected surge) or new unexpected workloads may come into the system. Therefore, the control engine 110 can comprise a built-in mechanism to transition smoothly from the normal mode to the unknown demand mode and transition back, while ensuring that only conservative, low-cost natural actions are scheduled in between.

More specifically, an exemplary normal mode control engine 110 algorithm can comprise:

Step 0—Initialize: A←∅.

Step 0.5—Unexpected workload? If
$(|Predicted_W(t) - Observed_W(t)| > Threshold)$
switch to 'Unexpected Workload' mode (Section 4.1.2). Otherwise continue to Step 1.

Step 1—Compute overall bleed-rate:

$$BR_W(t) = R_W(DemandW(t)) - R_W(Supply_W(t))$$

$$BR_{system}(t) = \sum_{W \in W} BR_W(t)$$

$$BR_{oversall} = \sum_{t=T_0}^{T} BR_{system}(t)$$

where $BR_{overall}$ is the overall utility bleed for the system assuming no further action is taken. If this quantity is zero or smaller than a threshold, return the empty schedule A. Otherwise proceed to Step 2.

Step 2—Divide future lookahead into phases: Divide $[T_0, T]$ into multiple phases $[T_0, T_1], [T_1, T_2], [T_2, T_3], \ldots$ based on user input and periodicity in the system. If the workloads normally follow some daily, weekly, monthly, yearly pattern, then $T_1$ can be set based on the daily pattern (say 1 or 2 days ahead), $T_2$ on the weekly pattern (say 1 or 2 weeks ahead), $T_3$ on the monthly pattern (say 1 or 2 months ahead), and so on.

Step 3—For each phase j: Evaluate options for phase j $[T_{j-1}, T_j]$, Starting state $S_{Tj-1}$ is the result of all the actions applied so far.

Step 3.0—Initialize: Set begin point $t_b = T_{j-1}$, and current state to $S_{tb}$.

Step 3.1—Compute local bleed-rate: As in Step 1, with the current state, $$BR_{overall}(t_b, T_j) = \sum_{t=t_b}^{Tj} BR_{system}(t)$$

where $BR_{overall}(t_b, T_j)$ is the bleed rate for the system if no further action is taken in the examination interval $[t_b, T_j]$ from state $S_{tb}$. If this quantity is zero or less than a threshold, skip to next phase, Step 3.9.

Step 3.2—Query Black-box-Wrappers: Query each black-box-wrapper $BBW_k (1 \leq k \leq \#$ Black boxes) with the current state $S_{tb}$, workload time series, remaining budget, and the lookahead examination interval $[t_b, T_j]$. Let $A_i (1 \leq i \leq m)$ be the set of actions returned from the black-boxes, each with its corresponding invocation parameters, along with the action activation time $t_{ai}$, the action lead time $t_{li}$ and the expected performance for the workloads.

Step 3.3—Compute benefits: The benefit, $Benefit_i$ for action $A_i (1 \leq i \leq m)$ is computed as $$UL_{W,i}(t) = R_W(Dem_W(t)) - R_W(Sup_{W,i}(t))$$

$$UL_i(t) = \sum_{W \in W} UL_{W,i}(t)$$

$$CUL_i = \sum_{t=t_b}^{Tj} UL_i(t) + AmortHWCost_i(t)$$

$$Benefit_i = BR_{overall}(t_b, T_j) - CUL_i$$

where $UL_i(t)$ is the utility loss at time t with Action $A_i$ is the performance provided for workload W at time t by choosing action $A_i$, $AmortHWCost_i(t)$ is the hardware cost, if any, for action $A_i$ amortized over a user specified period.

Step 3.4—Pick the best risk-adjusted benefit option:

$$\text{Benefit}_{i_{ad}} = \text{Benefit}_i * (1 + \min_i(0, RF(A_i)))$$

where $RF(A_i)$ is the risk factor calculated for action $A_i$ using the formula 4 in Section 4.2. $RF(A_i)$ is a nonpositive value and it evaluates the risk factor of implementing action i. If for all i, the, $\text{Benefit}_{i_{adjust}} < 0$ then 'no further action' option is the best and goes to Step 3.9.

Step 3.5—Update Action Schedule: Let $A_i$ be the action chosen.
$A = A \cup (A_i, t_{ai})$
where $t_{ai}$ is the corresponding action activation time.

Step 3.6—If small benefit, recurse going forward $(t_{li}, T_j)$: If $\text{Benefit}_i$ for the chosen action $A_i$ is less than a chosen threshold, skip to post-action part Step 3.8 with $t_b = t_{li}$ where $t_{li}$ is the action lead time for $A_i$.

Step 3.7—If large benefit, recurse $(t_{li}, T_j)$: If the benefit obtained is larger than the chosen threshold, then look for additional actions that can be run in combination to get further improvements. Skip to Step 3.8 with the same values for $t_b$.

Step 3.8—Repeat inner if $(t_b < T_j$ repeat from Step 3.1.
Step 3.9—Repeat outer next phase j=j+1.
Step 4.0—Output Output the action schedule A.

The control engine algorithm in the normal mode, discussed above, enters the unexpected workload mode when it finds that the observed values for workload demands differ from the predicted values. Once in this unexpected workload mode, the control engine 110 functions in an on-line fashion, continuously sensing the observed values and taking suitable actions to address the system's problems while at the same time trying to improve its predictors (e.g., using known techniques) so it can get back to the normal mode.

The decision of what choices to make when in the unexpected mode is challenging because the knowledge of the future is missing. Taking drastic actions such as migrating big data sets or adding hardware right away will be wasteful if the surge goes away quickly. On the other hand, not taking them at all will result in continuous bleeding if the surge continues. Therefore, the embodiments of the present invention employ a balancing strategy. That is, in the unexpected workload mode, the control engine 110 can employ the following exemplary algorithm that incorporates a balancing strategy.

Handling:
Step 0.6—Initialize: $t_{start} = t_{current}$.
Step 0.7—Compute local bleed-rate: $BR_{overall}(t_{current})$. If zero, do nothing.
Otherwise go to step H.2
Step 0.8—Implementing low-cost conservative options: Implement only these (e.g., throttling) in the beginning since duration of surge unknown.
Step 0.9—Implementing higher-cost options with bleed-balancing: Best risk-benefit Action $A_i$ (e.g, migration, replication, add hardware . . . ) of cost $Cost(A_i)$ only after surge has persisted for $\Delta t$ such $BR_{overall}(t_{start}, t_{start}+t)$ exceeds $Cost(A_i)$.
Learning: Continuously compute $\text{Predicted}_W(t)$ using known techniques and
If $|\text{Predicted}_W(t) - \text{Observed}_W(t)| < \text{Threshold}$ for certain $\Delta t$, switch back to control engine normal mode.

Again, the controller 110 can employ a primitive mechanism to transition between the normal and unexpected modes. That is, it can continuously compare the current system states (i.e., observed values) against the check states (i.e., predicted values). If the difference is large then it moves into the unexpected workload mode. While in that mode, it continuously updates its predictor function based on newly observed values. When the predicted values and the observed values are close enough for a sufficiently long period, it transitions back into the normal mode.

The embodiments of the invention can take the form of an entirely hardware embodiment, an entirely software embodiment or an embodiment including both hardware and software elements. In one embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system.

For example, a program storage device readable by computer and tangibly embodying a program of instructions executable by the computer can be used to perform the method described above for managing a data storage system and, more particularly, for automatically developing a time-based corrective actions schedule for resolving identified current and anticipated workload service level objective (SLO) violations within a data storage system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
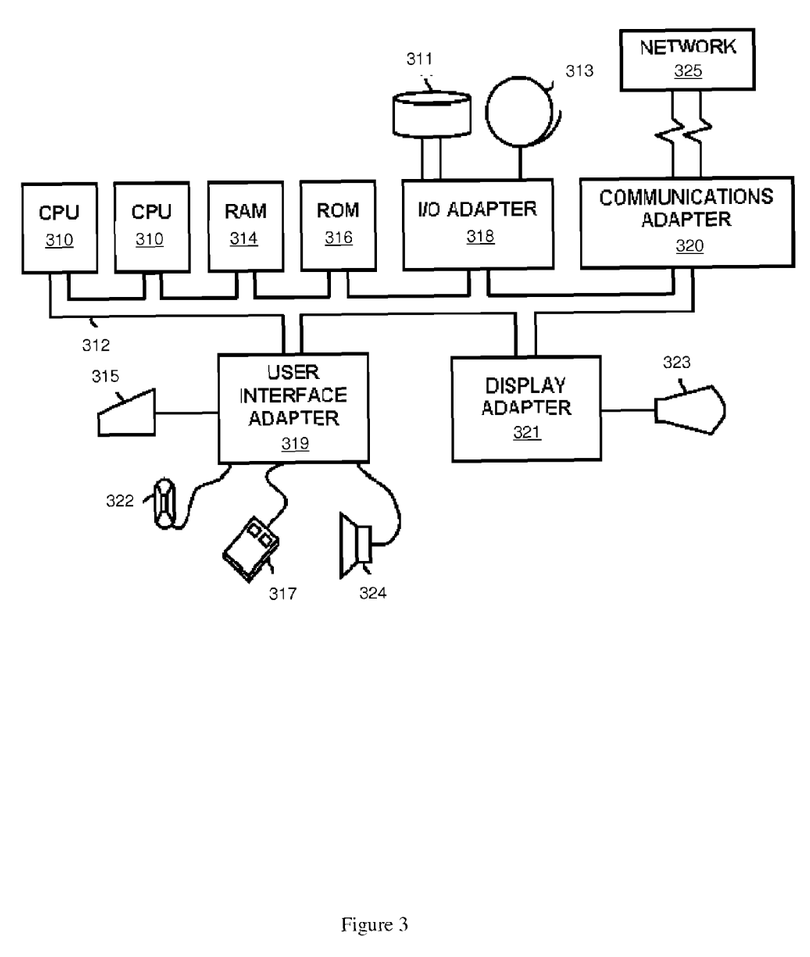
FIG. 3 is a schematic representation of a computer system suitable for use in the data storage management system as described herein.

A representative hardware environment for practicing the embodiments of the invention is depicted in FIG. 3. This schematic drawing illustrates a hardware configuration of an information handling/computer system in accordance with the embodiments of the invention. The system comprises at least one processor or central processing unit (CPU) 310. The CPUs 310 are interconnected via system bus 312 to various devices such as a random access memory (RAM) 314, read-only memory (ROM) 316, and an input/output (I/O) adapter 318. The I/O adapter 318 can connect to peripheral devices, such as disk units 311 and tape drives 313, or other program storage devices that are readable by the system. The system can read the inventive instructions on the program storage devices and follow these instructions to execute the methodology of the embodiments of the invention. The system further includes a user interface adapter 319 that connects a keyboard 315, mouse 317, speaker 324, microphone 322, and/or other user interface devices such as a touch screen device (not shown) to the bus 312 to gather user input. Additionally, a communication adapter 320 connects the bus 312 to a data processing network 325, and a display adapter 321 connects the bus 312 to a display device 323 which may be embodied as an output device such as a monitor, printer, or transmitter, for example.

Therefore, disclosed above are system and method embodiments that provide for the generation of a corrective action schedule based on the combined output of different planning tools in order to achieve a high business value. These embodiments provide a flexible and extensible way for new and/or existing planning tools to be incorporated into a single automated storage management framework. For example, the system can comprise a modular architecture where different independently developed planning tools can be plugged into a single united framework. These embodiments further allow for planning optimization according to user-specified time windows. That is, administrators can request schedules that are optimized over a day, a month, a year, etc., while considering multiple business constraints such as utility values and available budgets. These embodiments also provide a smooth transition between proactive and reactive schedule generation. Finally, the embodiments incorporate a risk-benefit analysis that is used when choosing among the different plans from the different planning tools.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments of the invention can be practiced with modification within the spirit and scope of the appended claims.

What is claimed is:

1. A management system for a data storage system comprising:
a controller receiving inputs, said inputs comprising:
business constraints, said business constraints comprising at least service level objectives (SLOs) associated with performance of said data storage system;
system attributes; and
a triggering event comprising an event indicative of at least one of a current violation and an anticipated violation of one of said service level objectives (SLOs); and
at least two different types of planning tools for operating said data storage system, said planning tools being in communication with said controller, and comprising at least two of the following: a workload throttling planning tool, a buffer size planning tool, a data migration planning tool and a new hardware planning tool; and
a calculator in communication with said controller and said planning tools,
said controller further performing the following:
automatically determining, based on said inputs, whether corrective action is warranted in response to said triggering event;
when said corrective action is warranted in response to said triggering event, generating a plurality of queries comprising different time periods; and
when said corrective action is not warranted in response to said triggering event, taking no further action respect to said triggering event;
said planning tools receiving said queries, each of said planning tools generating and outputting multiple corrective action plans for responding to said one of said current violation and said anticipated violation of said one of said service level objectives (SLOs) such that each corrective action plan is optimized for responding to said triggering event during a corresponding one of said different time periods and such that each corrective action plan specifies parameters for implementing said corrective action plan, and
said calculator calculating risk and utility values for each of said multiple corrective action plans based on said parameters, said business constraints and said system attributes, wherein the utility value of a corrective action plan indicates an expected workload benefit to said data storage system when said corrective action plan is implemented and the risk value of said corrective action plan indicates a probability that said expected workload benefit will be lost as a result of any of volatility in workload time-series functions and human error, and
said controller comparing and ranking, for a specified time period, said risk and utility values of said multiple corrective action plans, selecting at least one of said multiple corrective action plans to perform during said specified time period based on said ranking and creating and outputting a schedule for implementing said at least one of said multiple corrective action plans in said specified time period.

2. The management system of claim 1, further comprising:
a translator in communication with said controller and said planning tools, said translator translating said query into appropriate formats for input into each of said planning tools.

3. The management system of claim 1,
said business constraints comprising utility functions, budget constraints, a desired analysis window and said service level objectives (SLOs), and
said system attributes comprising current and anticipated system states.

4. The management system of claim 1,
said controller further generating, when said corrective action is warranted in response to said triggering event, a plurality of queries specifying different time periods, and
said planning tools each outputting multiple corrective action plans for responding to said one of said current violation and said anticipated violation of said one of said service level objectives (SLOs), each corrective action plan being optimized for responding to said triggering event during a corresponding one of said different time periods.

5. The management system of claim 1, said schedule comprising a time-based schedule comprising:
more than one of said corrective action plans;
a sequence for implementing said corrective action plans; and
approximate times for initiating and completing said corrective action plans.

6. The management system of claim 1,
said schedule further comprising checkpoint states each of which comprises an anticipated state of said data storage system during said implementing of said at least one of said corrective action plans according to said schedule, and said controller altering said schedule based on differences between an actual state of said data storage system at a given time and a checkpoint state for said given time.

7. A management system for a data storage system comprising:

a controller receiving inputs, said inputs comprising:
business constraints, said business constraints comprising at least service level objectives (SLOs) associated with performance of said data storage system;
system attributes; and
a triggering event comprising an event indicative of at least one of a current violation and an anticipated violation of one of said service level objectives (SLOs);
at least two different types of planning tools for operating said data storage system, said planning tools being in communication with said controller and comprising at least two of the following: a workload throttling planning tool, a buffer size planning tool, a data migration planning tool and a new hardware planning tool; and
a calculator in communication with said controller and said planning tools,
said controller further performing the following;
automatically determining, based on said inputs, whether corrective action is warranted in response to said triggering event;
when said corrective action is warranted in response to said triggering event, generating a plurality of queries comprising different time periods; and,
when said corrective action is not warranted in response to said triggering event, taking no further action respect to said triggering event;
said planning tools receiving said queries, each of said planning tools generating and outputting multiple corrective action plans for responding to said one of said current violations and said anticipated violation of one of said service level objectives (SLOs) such that each corrective action plan is optimized for responding to said triggering event during a corresponding one of said different time periods and such that each corrective action plan specifies parameters for implementing said corrective action plan,
said calculator calculating risk and utility values for each of said multiple corrective actions based on said parameters, said business constraints and said system attributes, wherein the utility value of a corrective action plan indicates an expected workload benefit to said data storage system when said corrective action plan is implemented and the risk value of said corrective action plan indicates a probability that said expected workload benefit will be lost as a result of any of volatility in workload time-series functions and human error, and
said controller comparing and ranking, for a specified time period, said risk and utility values of said multiple corrective action plans, selecting multiple ones said multiple corrective action plans to perform during said specified time period based on said ranking, and creating and outputting a schedule for implementing said multiple ones of said multiple corrective action plans in said specified time period.

8. The management system of claim 7,
said business constraints further comprising utility functions, budget constraints, and a desired analysis window, and
said system attributes comprising current and anticipated system states.

9. The management system of claim 7, further comprising a translator in communication with said controller and said planning tools, said translator translating said queries into appropriate formats for input into each of said planning tools.

10. The management system of claim 7, said schedule further comprising a time-based schedule comprising:
a sequence for implementing said selected ones of said multiple corrective action plans; and
approximate times for initiating and completing said selected ones of said multiple corrective action plans.

11. The management system of claim 7,
said schedule further comprising checkpoint states, each of which comprises an anticipated state of said data storage system during said implementing of said selected ones of said multiple corrective action plans according to said schedule, and
aid controller further alters said schedule based on differences between an actual state of said data storage system at a given time and a checkpoint state for said given time.

12. A computer-implemented method for managing a data storage system, said method comprising:
receiving, by a computer, inputs, said inputs comprising:
business constraints, said business constraints comprising at least service level objectives (SLOs) associated with performance of said data storage system;
system attributes; and
a triggering event comprising an event indicative of at least one of a current violation and an anticipated violation of one of said service level objectives (SLOs);
automatically determining, by said computer and based on said inputs, whether corrective action is warranted in response to said triggering event;
when said corrective action is warranted in response to said triggering event, generating, by said computer, plurality of queries comprising different time periods;
when said correction action is not warranted in response to said triggering event, taking, by said computer, no further action in response to said triggering event;
receiving, by at least two different types of planning tools of said computer for operating said data storage system, said queries, each of said planning tools further generating and outputting multiple corrective action plans for responding to said one of said current violation and said anticipated violation of said one of said service level objectives (SLOs) such that each corrective action plan is optimized for responding to said triggering event during a corresponding one of said different time periods and such that each corrective action plan specifies parameters for implementing said corrective action plan, said planning tools comprising at least two of the following: a workload throttling planning tool, a buffer size planning tool, a data migration planning tool and a new hardware planning tool;
calculating, by said computer, risk and utility values for each of said multiple corrective action plans based on said parameters, said business constraints and said system attributes, wherein the utility value of a corrective action plan indicates an expected workload benefit to said data storage system when said corrective action plan is implemented and the risk value of said corrective action plan indicates a probability that said expected workload benefit will be lost as a result of any of volatility in workload time-series functions and human error;
comparing and ranking, by said computer and for a specified time period, said risk and utility values of said multiple corrective action plans and selecting at least one of said multiple corrective actions to perform during said specified time period based on said ranking, and automatically creating and outputting, by said computer, a schedule for implementing said at least one of said multiple corrective action plans in said specified time period.

13. The method of claim 12, said business constraints comprising utility functions, budget constraints, a desired analysis window and said service level objectives (SLOs), said service level objectives (SLOs) comprising service-level objective (SLO) violation thresholds, and said system attributes comprising current and anticipated system states.

14. The method of claim 12, said generating further comprising generating, when said corrective action is warranted in response to said triggering event, a plurality of queries specifying different time periods, and said creating and outputting further comprising creating and outputting multiple corrective action plans for responding to said one of said current violation and said anticipated violation of said one of said service level objectives (SLOs), each corrective action plan being optimized to respond to said triggering event during a corresponding one of said different time periods.

15. The method of claim 12, said creating of said schedule further comprising:

selecting more than one of said corrective action plans;

determining a sequence for said implementing of said more than one of said corrective action plans; and determining approximate times for initiating said implementing of said more than one of said corrective action plans.

16. The method of claim 12, further comprising continuously monitoring an impact of any corrective action plan implemented in said data storage system.

17. The method of claim 12, further comprising automatically translating, by said computer system said query into appropriate formats for input into each of said planning tools.

18. A program storage device readable by computer and tangibly embodying a program of instructions that, when executed by said computer, perform a method of managing a data storage system, said method comprising:

receiving inputs, said inputs comprising:

business constraints, said business constraints comprising at least service level objectives (SLOs) associated with performance of said data storage system;

system attributes; and a triggering event comprising an event indicative of at least one of a current violation and an anticipated violation of one of said service level objectives (SLOs);

automatically determining, based on said inputs, whether corrective action is warranted in response to a triggering event;

when said corrective action is warranted in response to said triggering event, generating a plurality of queries comprising different time periods;

when said correction action is not warranted in response to said triggering event, taking no further action in response to said triggering event;

receiving, by at least two different planning tools for operating said data storage system, said queries, each of said planning tools further generating and outputting multiple corrective action plans for responding to said one of said current violation and said anticipated violation of said one of said service level objectives (SLOs) such that each corrective action plan is optimized for responding to said triggering event during a corresponding one of said different time periods and such that each corrective action plan specifies parameters for implementing said corrective action plan, said planning tools comprising at least two of the following: a workload throttling planning tool, a buffer size planning tool, a data migration planning tool and a new hardware planning tool;

calculating risk and utility values for each of said multiple corrective action plans based on said parameters, said business constraints and said system attributes, wherein the utility value of a corrective action plan indicates an expected workload benefit to said data storage system when said corrective action plan is implemented and the risk value of said corrective action plan indicates a probability that said expected workload benefit will be lost as a result of any of volatility in workload time-series functions and human error;

comparing and ranking, for a specified time period, said risk and utility values of said multiple corrective action plans and selecting at least one of said multiple corrective actions to perform during said specified time period based on ranking; and automatically creating and outputting a schedule for implementing said at least one of said multiple corrective action plans in said specified time period.

19. The program storage device of claim 18, said business constraints comprising utility functions, budget constraints, a desired analysis window and said service level objectives (SLOs), said service level objectives (SLOs) comprising service-level objective violation thresholds, and said system attributes comprising current and anticipated system states.

20. The program storage device of claim 18, said generating further comprising generating, when said corrective action is warranted in response to said triggering event, a plurality of queries specifying different time periods so that multiple corrective action plans, and said creating and outputting further comprising creating and outputting multiple corrective action plans for responding to said one of said current violation and said anticipated violation of said one of said service level objectives (SLOs), each corrective action plan being optimized to respond to said triggering event during a corresponding one of said different time periods.

21. The program storage device of claim 18, said creating of said schedule further comprising:

selecting more than one of said corrective action plans;

determining a sequence for said implementing of said more than one of said corrective action plans; and determining approximate times for initiating said implementing of said more than one of said corrective action plans.

22. The program storage device of claim 18, said method further comprising continuously monitoring an impact of any corrective action plan implemented in said data storage system.

23. The program storage device of claim 18, said method further comprising automatically translating said query into appropriate formats for input into each of said planning tools.

* * * * *